United States Patent

Baumann et al.

Patent Number: 5,690,193
Date of Patent: Nov. 25, 1997

[54] ARRANGEMENT FOR OPERATING A PARKING BRAKE

[75] Inventors: Hans-Uwe Baumann, Stuttgart; Josef Paleczek, Weil der Stadt, both of Germany

[73] Assignee: Dr. Ing. h.c.F. Porsche AG, Weissach, Germany

[21] Appl. No.: 617,146

[22] Filed: Mar. 18, 1996

[30] Foreign Application Priority Data

Mar. 16, 1995 [DE] Germany .................. 195 09 469.7

[51] Int. Cl.⁶ .................................................. F16D 55/08
[52] U.S. Cl. ........................... 188/72.9; 74/501.5 R
[58] Field of Search ........................ 188/72.9, 2 D; 74/501.5 R, 502.6

[56] References Cited

U.S. PATENT DOCUMENTS

| | | | |
|---|---|---|---|
| 4,529,155 | 7/1985 | Bramwell et al. | 74/501.5 R X |
| 4,753,325 | 6/1988 | Jaksic | 188/106 A |
| 4,776,543 | 10/1988 | Stableford | 74/501.5 R X |
| 4,932,503 | 6/1990 | Yamamoto | 188/106 A |

FOREIGN PATENT DOCUMENTS

| | | |
|---|---|---|
| 666395 | 11/1965 | Belgium . |
| 88 10 362.5 | 11/1988 | Germany . |
| 39 04 460 | 11/1992 | Germany . |
| 39 24 549 | 3/1993 | Germany . |

Primary Examiner—Robert J. Oberleitner
Assistant Examiner—Pamela J. Lipka
Attorney, Agent, or Firm—Evenson, McKeown, Edwards & Lenahan, P.L.L.C.

[57] ABSTRACT

An arrangement for operating a parking brake for a motor vehicle has braking devices which are arranged on the wheel side and can be operated by way of tension members. The tension members are guided around by way of deflecting elements and, via a transmission element, are connected with a hand brake lever. The deflecting elements consist of two segments which are disposed opposed to one another and on a common swivel axis and are held in an inoperative position by at least one return element. Each segment has a deflecting contour with guide grooves for the tension cables forming the tension members.

15 Claims, 5 Drawing Sheets

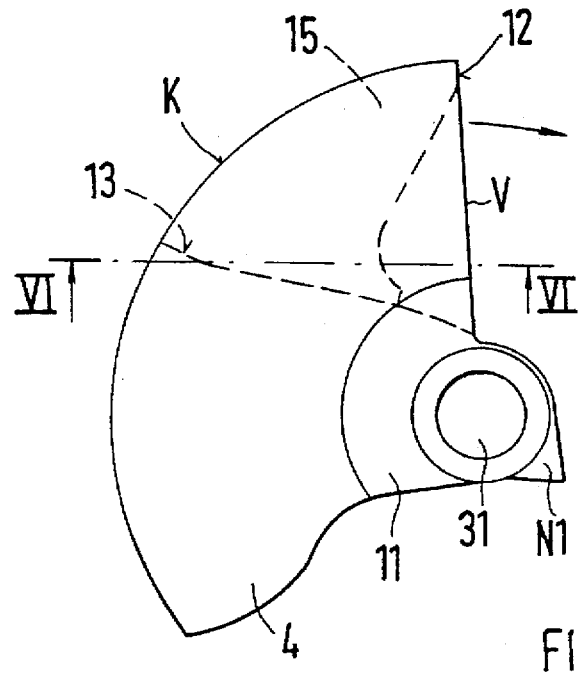
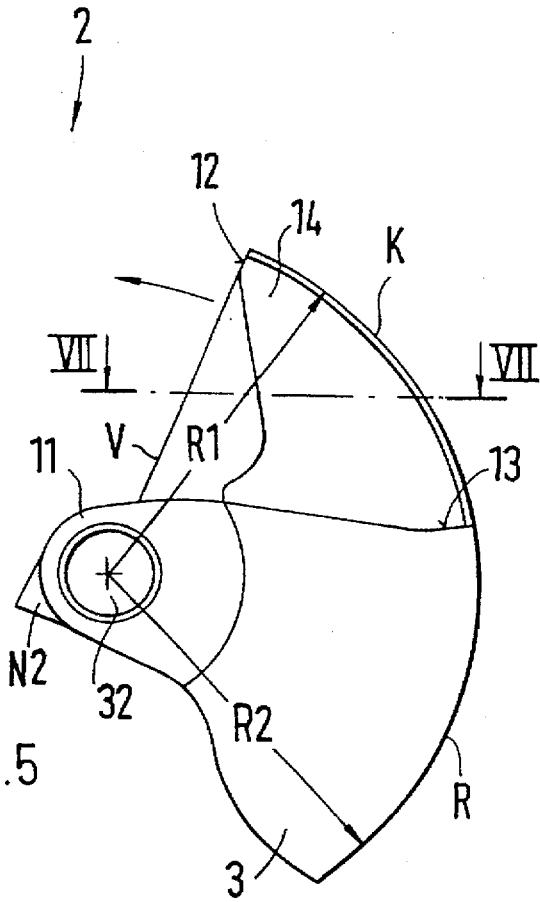
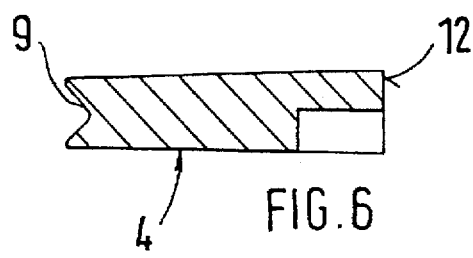
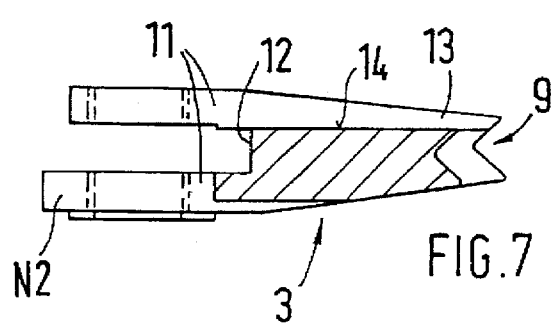
FIG.5
FIG.6
FIG.7

ARRANGEMENT FOR OPERATING A PARKING BRAKE

BACKGROUND AND SUMMARY OF THE INVENTION

This invention relates to an arrangement for operating a parking brake and, more particularly, to an arrangement for operating a parking brake for a motor vehicle having braking devices which are arranged on the wheel side and can be operated by way of tension members which are guided around deflecting elements and are connected with a hand brake lever via a transmission element.

From German Patent document DE 39 24 549 C2, an arrangement is known for operating a vehicle parking brake which has deflection paths for tension members arranged in a housing. The tension members in the area of the deflection paths consist of chains which are each connected with a Bowden cable.

It is an object of the present invention to provide an operating arrangement for a parking brake which has a compact and small construction, implements an easy mounting possibility and, by which, a supporting return of the hand brake is ensured.

According to the present invention, this object is achieved by an arrangement for operating a parking brake for a motor vehicle having braking devices which are arranged on the wheel side and can be operated by way of tension members which are guided around deflecting elements and are connected with a hand brake lever via a transmission element. The deflecting element consists of two segments which are disposed opposite one another on a common swivel axis. By way of at least one return element, the two segments are held in an inoperative position. Each segment has a deflecting contour with guide grooves for the tension cables.

The principal advantages achieved by the present invention are that the individual segments forming a deflecting element for the tension members, as, for example, for the tension cables, are guided in one another. This results in a space-saving and compact constructional unit.

These segments are swivellably disposed in a housing which consists, for example, of a one-piece casting and, together with this casting, form an assembly unit which can be preassembled in the vehicle without tension cables. The tension cables are threaded in only after the fastening of the housing on a vehicle cross member or an engine partition wall. Advantageously, this takes place by way of inserting ducts which extend from the outside into the housing and, in the interior, extend directly to the segments.

For receiving the tension cables, the segments have guides which cooperate with corresponding guides in the housing. These housing guides make it possible for the tension cables, during the threading-in, to be guided from the outside around the segments. This therefore allows a simple mounting of the tension cables, when the housing is screwed on, on the vehicle cross member or on other locations of the vehicle body.

The segments can be returned by way of a return element from an operating position when the hand brake is pulled, while being supported by way of the return element into an inoperative position. The return element can be a spring or an elastic rubber element.

The housing is constructed in one piece such that the segments are disposed via a pivot, and the spring is disposed via a pin. In the outside area, the guide ducts are constructed to be in one piece with the housing. In the inside area of the housing, the deflecting ducts are preferably also constructed in one piece with the housing. However, the deflecting ducts may also consist of plastic and be connected with the housing. When the housing is fastened, it is therefore possible in a simple manner to thread the tension cables from the outside onto the segments and to guide them through to the transmission element and hang them here.

The segments may also be only approximately in the shape of a graduated circle; that is, they are constructed in a spiral shape such that various lever arms can be produced with respect to the axis of rotation. As a result, a gear increase or a gear reduction becomes possible.

Other objects, advantages and novel features of the present invention will become apparent from the following detailed description of the invention when considered in conjunction with the accompanying drawings.

BRIEF DESCRIPTION OF THE DRAWINGS

FIG. 5 is a top view of segments of a deflecting element according to the invention;

FIG. 6 is a sectional view taken along Line VI—VI of FIG. 5;

FIG. 7 is a sectional view taken along Line VII—VII of FIG. 5; and

DETAILED DESCRIPTION OF THE DRAWINGS

Figure 1:
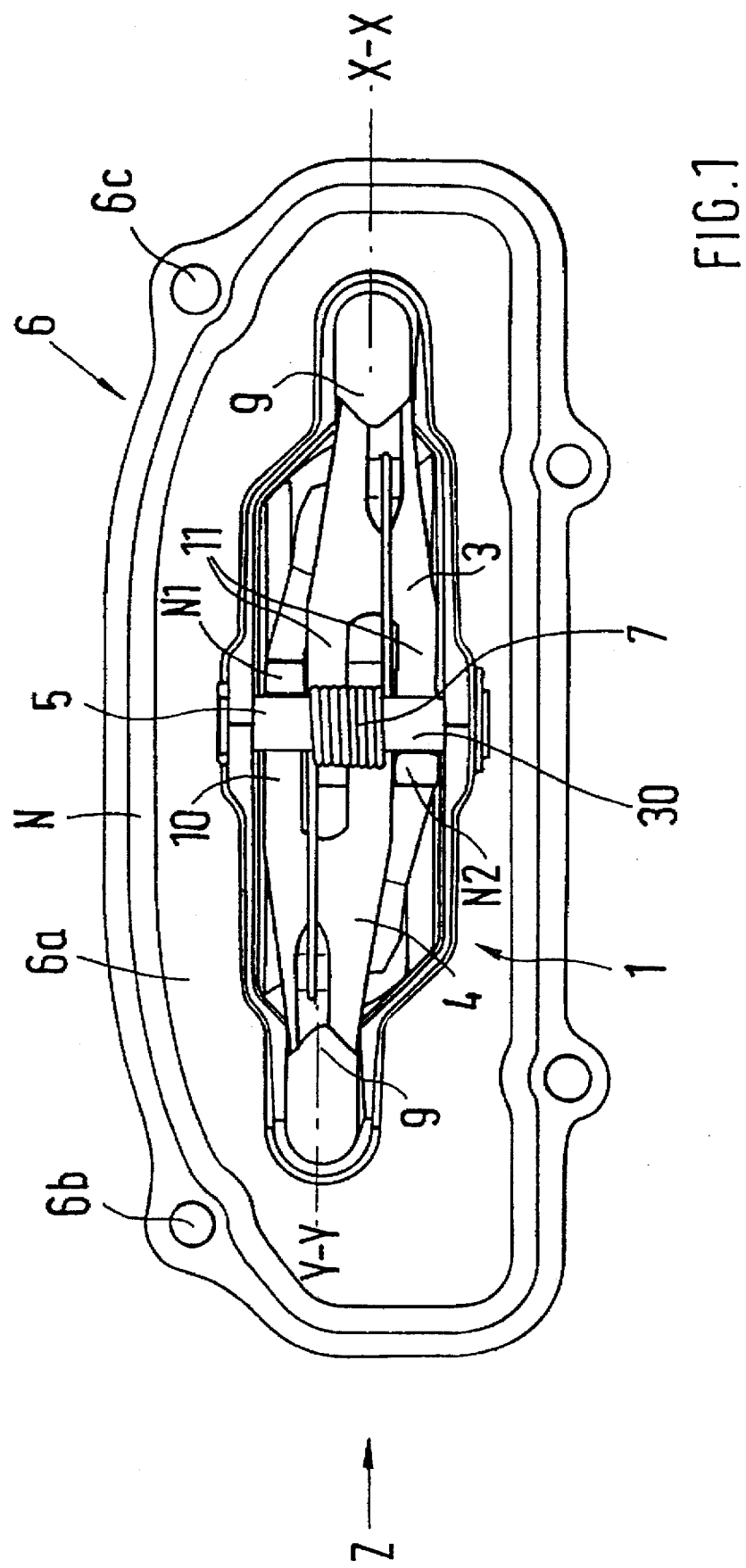
FIG. 1 is a frontal view of an operating device with a housing according to the present invention.

Referring to FIG. 1, an operating arrangement 1 for a parking brake includes two segments 3 and 4 constructed as deflecting elements 2 (FIG. 5) which are held swivellably with respect to one another on a pivot 5 in a housing 6. By way of a return element, such as a leg spring 7, the segments 3, 4 are held in an inoperative position. The inoperative position is assumed when the hand brake is released. In this inoperative position, the noses N1 and N2 of the segments 3, 4 are supported on the pin 30. The noses N1 and N2 position the segments 3, 4 with respect to one another. Stops may also be provided on the housing so that the noses on the segments may be omitted.

The segments 3, 4 each have a graduated-circle-shaped deflecting contour K (FIG. 5) for tension members, such as tension cables 8, 8a. The tension cables 8, 8a are guided in a wedge-shaped guide groove 9 (FIGS. 6 and 7). The segments 3, 4 are guided on one another by way of intermeshing legs 10, 11 (FIG. 1).

As illustrated in detail in FIGS. 5 to 7, the segments 3, 4 each have stop faces 12, 13 which adjoin one another when the segments are in the inoperative position; that is, when the hand brake is released and the leg spring 7 presses the segments against one another.

For achieving a flat arrangement of the two segments 3, 4, these segments 3, 4 have surface sections 14, 15 which are recessed with respect to their exterior surface and which are opposite one another. On these surface sections 14, 15, the two segments 3, 4 are mutually guided or supported. As a result, the tension cables 8, 8a are guided in two planes X—X and Y—Y situated close to one another. In the transition from these surface sections 14, 15 to the exterior surface of the segments 3, 4, stop edges 13 are formed. The stop edges 13 are opposite the stop edges 12 of the front edges V of the segments 3, 4.

Figure 3:
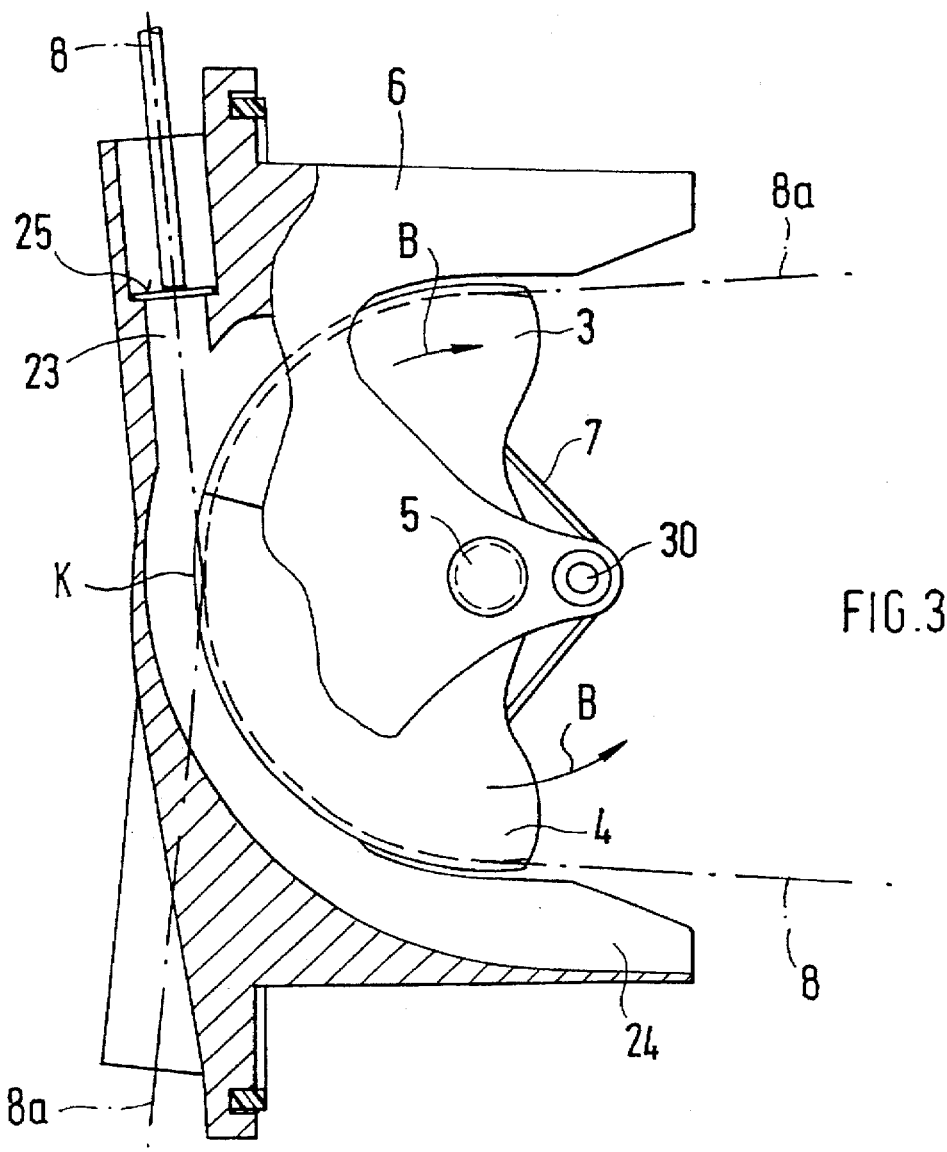
FIG. 3 is a sectional view taken along Line III—III of FIG. 2.
Figure 4:
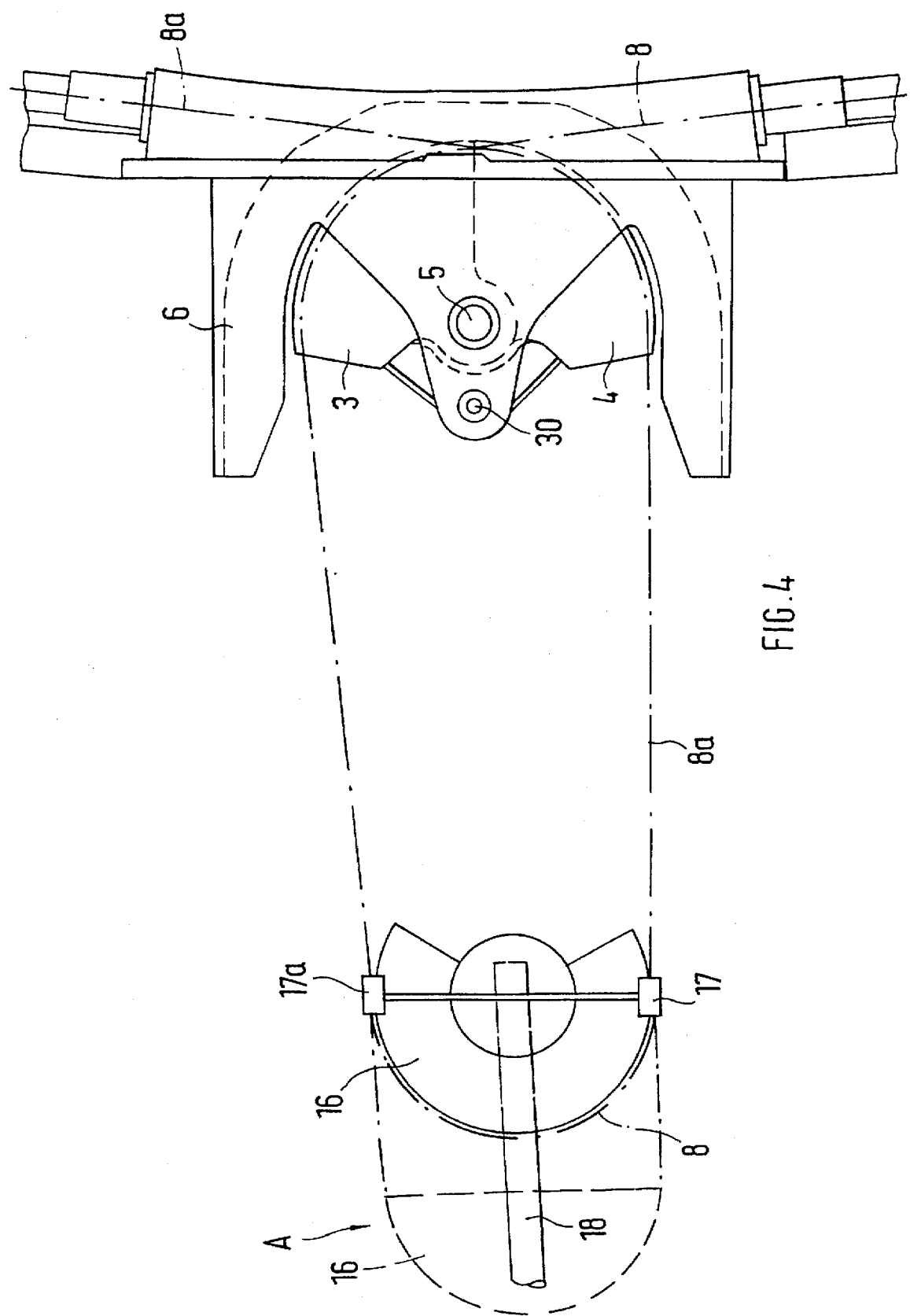
FIG. 4 is a top view of the arrangement with a transmission element.

As illustrated in detail in FIG. 4, the tension cables 8, 8a of each brake wind around a segment 3, 4. Thus, the tension cable 8 is received by segment 3 and the tension cable 8a is received by segment 4. The tension cables 8 and 8a are each hung in a transmission element 16; for example, by way of a shaped-on pivot 17 for cable 8 and a shaped-on pivot 17a for cable 8a. A tension rod 18 is connected with the transmission element 16 and is guided to a hand brake lever which is not shown. During the braking operation, the transmission element 16 is pulled into position A, and the tension cables 8, 8a are therefore pulled, the segments 3, 4 rotating with respect to one another about the pivot 5 against a tension of the spring 7 in the direction of the arrow B (FIG. 3). When the brake is released, the segments 3, 4 swivel back into their starting position (inoperative position) (FIG. 3), in which case this operation is significantly supported by the spring 7.

The return spring 7 mainly ensures that during the threading of the cables 8, 8a, the segments 3, 4 cannot be shifted into a position deviating from the inoperative position.

Figure 8:
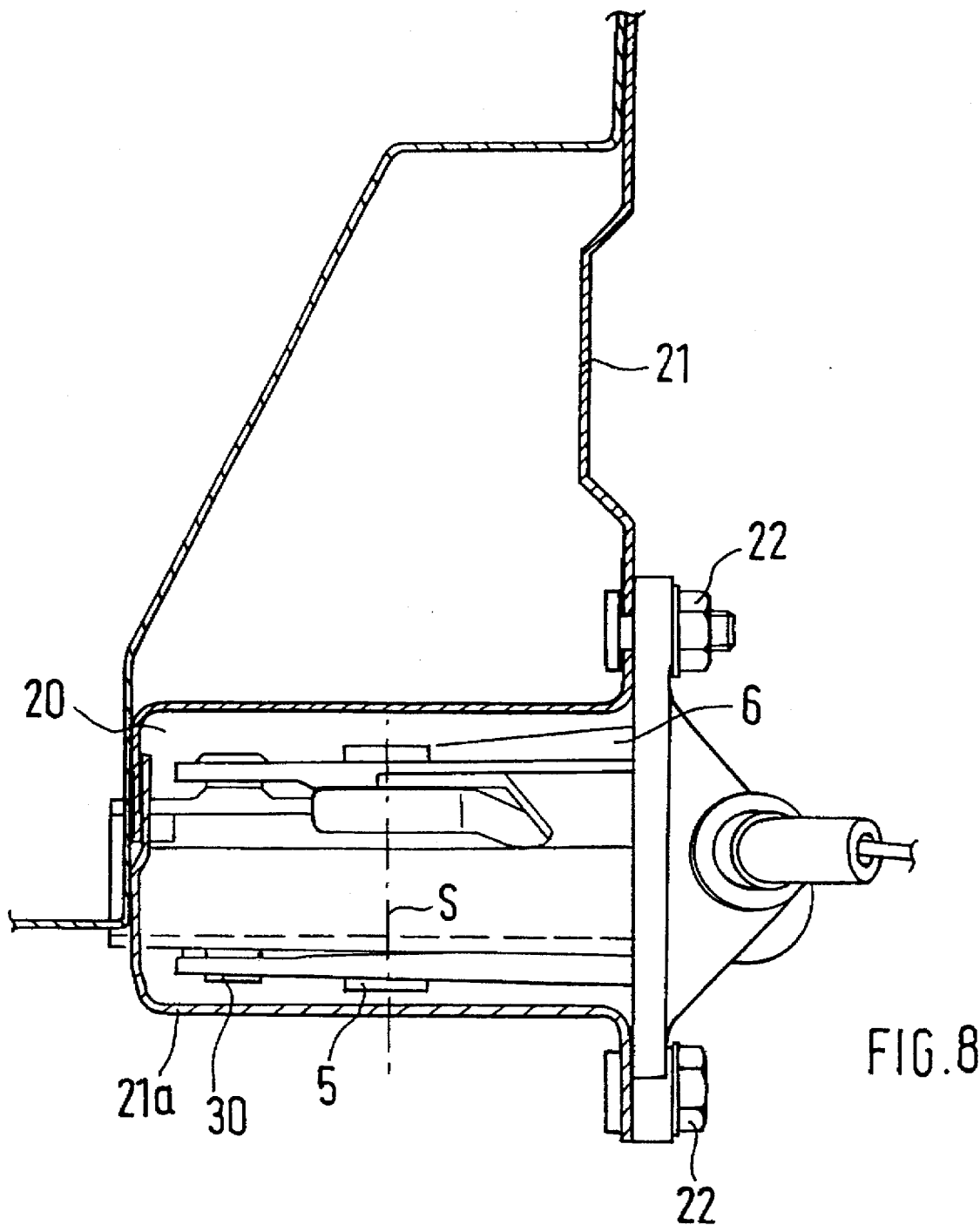
FIG. 8 is a sectional view of a vehicle cross member with an inserted housing for the operating arrangement.

The segments 3, 4 are housed in a one-piece cast housing 6 which can be inserted in an opening 20 of a vehicle cross member 21 (FIG. 8). By way of screws 22, the housing 6 is fastened on the cross member 21. The opening 22 is closed off in the downward direction by way of a closing cover 21a.

The housing 6 has insertion ducts 23 (FIG. 3) for the tension cables 8, 8a which extend around the exterior contour K of the segments 3, 4 and end in a straight duct 24.

For mounting the operating arrangement, the housing 6 with the installed segments 3, 4 is fastened in the cross member 21. Then, the tension cables 8, 8a are threaded into the ducts 23 and are guided to the transmission element 16. The shells of the tension cables 8, 8a are supported in the duct 23 on the step 25.

Figure 2:
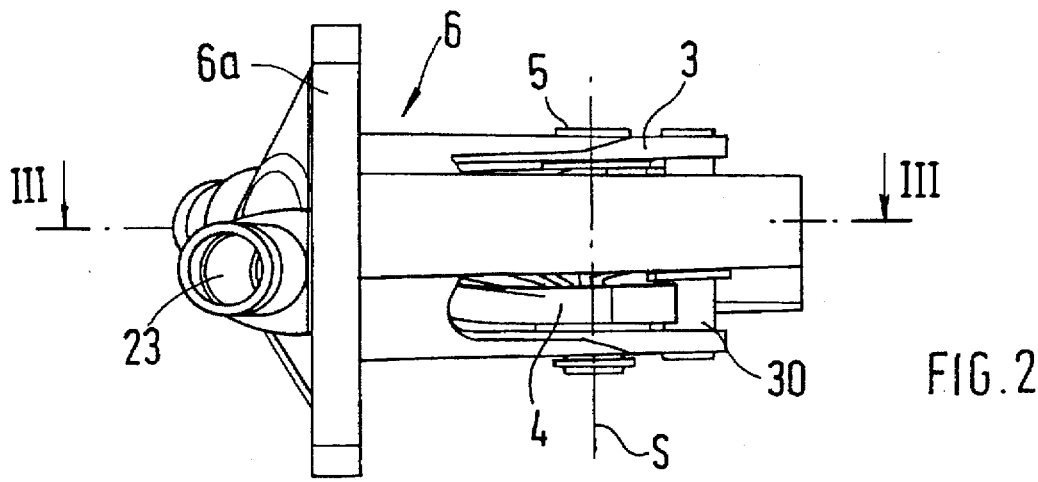
FIG. 2 is a lateral view of the arrangement of FIG. 1 in the direction of the arrow Z.

The housing has an end plate 6a (FIGS. 1 and 2) in which at least two screw bores are arranged in a diagonal manner. Preferably, four screw bores are provided, two screw bores 6b, 6c being provided on each longitudinal side of the plate 6a. In this plate 6a, a surrounding groove N is provided for receiving a sealing element. The bearing plates for the pivot 5 extend away from the housing plate 6a. The straight guide ducts 24 are formed by castings of the housing 6 which have a U-shaped cross-section.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An operating arrangement for a parking brake for a motor vehicle having braking mechanisms operatively arranged on wheels of the vehicle which are operable via tension members guided around a deflecting element, the tension members being coupled with a hand brake lever via a transmission element, the operating arrangement comprising:

at least two segments forming the deflecting element, said at least two segments being disposed opposite one another and arranged on a common swivel axis;

at least one return element by which said at least two segments are held in an inoperative position;

a housing in which said at least two segments are arranged, said housing having an insertion duct on each side thereof for the tension members;

wherein each of said at least two segments has a deflecting contour with a guide groove for the tension member; and wherein said insertion ducts are located near, and open into, an area of the deflecting contour.

2. An operating arrangement according to claim 1, wherein said tension members are tension cables.

3. An operating arrangement according to claim 2, wherein said at least two segments each have a graduated-circle-shaped deflecting contour.

4. An operating arrangement according to claim 2, wherein the deflecting contour extends in a spiral manner such that an inlet and an outlet on each segment for the tension cables are connected via a ramp, with said inlet having a first radius different than a second radius for the outlet.

5. An operating arrangement according to claim 1, wherein the segments forming the deflecting element extend around legs which intermesh in a claw-type manner so as to form bearing sections which are penetrated by a pivot in order to form a swivel shaft.

6. An operating arrangement according to claim 1, wherein the return element comprises a leg spring held on a pin, each leg of said leg spring acting upon one of the at least two segments in a prestressed manner.

7. An operating arrangement according to claim 1, wherein the at least two segments each have exterior stop faces and interior stop faces arranged opposite one another so as to form a mutual support for the two segments under a spring tension from the return element.

8. An operating arrangement according to claim 1, wherein the two segments are guided on one another via surface sections arranged in a recessed manner with respect to an exterior surface of the respective segments.

9. An operating arrangement according to claim 3, wherein in an area of the graduated-circle-shaped deflecting contour, said insertion ducts approach the contour and end in guide ducts.

10. An operating arrangement according to claim 9, wherein said housing is inserted into an opening of a vehicle cross member and fastened thereto via screws.

11. An operating arrangement according to claim 2, wherein the tension cables extend in the guide grooves of the two segments in two planes and are hung in the transmission element which is connected with the hand brake lever via a rod.

12. An operating arrangement according to claim 9, wherein the housing, including the at least two segments, is constructed as a premountable component, said tension cables being subsequently threaded through the insertion ducts into the housing and onto the at least two segments.

13. An operating arrangement according to claim 9, wherein said housing further comprises an end plate provided with at least two screw bores and a groove for a sealing element;

wherein bearing sections for the pivot are provided which project to the end plate and which, on both sides, have guide ducts having a U-shaped cross-section.

14. An operating arrangement according to claim 9, wherein the interior guide ducts are formed of a plastic material and are integrally connected with the housing.

15. An operating arrangement according to claim 1, wherein the two segments each have noses in an area of bearing bores, said noses being supported on a pin for positioning the two segments in an inoperative position.

* * * * *